US012249358B2

(12) United States Patent
Asif Bashir et al.

(10) Patent No.: US 12,249,358 B2
(45) Date of Patent: *Mar. 11, 2025

(54) MAGNETIC RECORDING DEVICES HAVING EXTERNAL ALTERNATING CURRENT SOURCES

(71) Applicant: Western Digital Technologies, Inc., San Jose, CA (US)

(72) Inventors: Muhammad Asif Bashir, San Jose, CA (US); Petrus Antonius Van Der Heijden, Cupertino, CA (US); James Terrence Olson, San Jose, CA (US); Alexander Goncharov, Morgan Hill, CA (US); Zhigang Bai, Fremont, CA (US); Yunfei Ding, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,472

(22) Filed: Dec. 14, 2023

(65) Prior Publication Data

US 2024/0112694 A1 Apr. 4, 2024

Related U.S. Application Data

(63) Continuation of application No. 17/183,161, filed on Feb. 23, 2021, now Pat. No. 11,869,548.
(Continued)

(51) Int. Cl.
*G11B 5/00* (2006.01)
*G11B 5/31* (2006.01)

(52) U.S. Cl.
CPC ............ *G11B 5/315* (2013.01); *G11B 5/3116* (2013.01)

(58) Field of Classification Search
CPC ... G11B 5/3146; G11B 5/3967; G11B 5/3135; G11B 5/115; G11B 5/1875;
(Continued)

(56) References Cited

U.S. PATENT DOCUMENTS 6,201,653 B1   3/2001   Contreras et al.
7,212,367 B2   5/2007   Clinton et al.
(Continued)

FOREIGN PATENT DOCUMENTS

CN   104835510 B    11/2017
JP   2013251042 A   12/2013
WO   2015126326 A1   8/2015

OTHER PUBLICATIONS

Koga et al. "Increasing AC-Field Frequency in Microwave-Assisted Magnetic Recording," Intermag, EQ-03, 2015, 1 page.
(Continued)

*Primary Examiner* — Nabil Z Hindi
(74) *Attorney, Agent, or Firm* — PATTERSON + SHERIDAN, LLP

(57) ABSTRACT

Aspects of the present disclosure generally relate to a magnetic recording head assembly that includes an external alternating current (AC) source. A magnetic recording head of the magnetic recording head assembly includes a conductive structure between a main pole and a trailing shield. The conductive structure includes a conductive layer, and the conductive layer is nonmagnetic. The magnetic recording head assembly also includes an external AC source to supply AC current that flows through the conductive structure. In one aspect, the conductive structure is between a coil structure and the trailing shield, and the external AC source is coupled to the coil structure. The conductive structure and the external AC source facilitate consistently providing an
(Continued)

enhanced AC writing field to facilitate effective and reliable writing, high ADC, high SNR, and reduced jitter.

22 Claims, 7 Drawing Sheets

Related U.S. Application Data

(60) Provisional application No. 63/107,085, filed on Oct. 29, 2020.

(58) Field of Classification Search
CPC ....... G11B 5/1278; G11B 5/23; G11B 5/3133; G11B 5/315; G11B 2005/0021; G11B 5/3134
USPC .......................................................... 360/59
See application file for complete search history.

(56) References Cited

U.S. PATENT DOCUMENTS

| | | |
|---|---|---|
| 7,593,184 B2 | 9/2009 | Clinton et al. |
| 7,724,469 B2 | 5/2010 | Gao et al. |
| 7,848,054 B2 | 12/2010 | Hsiao et al. |
| 8,179,747 B1 | 5/2012 | Mugino et al. |
| 8,355,222 B2 | 1/2013 | Mino et al. |
| 8,411,390 B2 | 4/2013 | Franca-Neto et al. |
| 8,472,135 B1 | 6/2013 | Kusukawa et al. |
| 8,547,656 B2 | 10/2013 | Igarashi et al. |
| 8,547,661 B2 | 10/2013 | Bai |
| 8,582,240 B1 | 11/2013 | Chen et al. |
| 8,587,900 B2 | 11/2013 | Franca-Neto et al. |
| 8,705,206 B1 | 4/2014 | Maeda et al. |
| 8,724,242 B2 | 5/2014 | Gao |
| 8,724,259 B1 | 5/2014 | Liu et al. |
| 8,737,006 B2 | 5/2014 | Livshitz et al. |
| 8,786,984 B2 | 7/2014 | Das et al. |
| 8,929,030 B2 | 1/2015 | Hou et al. |
| 8,988,826 B2 | 3/2015 | Sugiyama et al. |
| 8,995,088 B1 | 3/2015 | Boone et al. |
| 9,001,465 B1 | 4/2015 | Shimizu et al. |
| 9,019,646 B2 | 4/2015 | Rausch et al. |
| 9,159,339 B2 | 10/2015 | Scholz et al. |
| 9,230,571 B1 | 1/2016 | Chen et al. |
| 9,275,672 B2 | 3/2016 | Shiroishi et al. |
| 9,299,367 B1 | 3/2016 | Tang et al. |
| 9,355,655 B1 | 5/2016 | Udo et al. |
| 9,368,135 B2 | 6/2016 | Gao |
| 9,443,541 B1 | 9/2016 | Liu et al. |
| 9,466,319 B1 | 10/2016 | Tang et al. |
| 9,478,242 B1 | 10/2016 | Liu et al. |
| 9,536,548 B1 | 1/2017 | Narayana |
| 9,691,416 B1 | 6/2017 | Izawa et al. |
| 9,792,933 B2 | 10/2017 | Koizumi et al. |
| 9,881,637 B1 | 1/2018 | Wilson et al. |
| 10,121,497 B1 | 11/2018 | Takahashi et al. |
| 10,181,334 B1 | 1/2019 | Song et al. |
| 10,186,284 B2 | 1/2019 | Narita et al. |
| 10,236,021 B2 | 3/2019 | Narita et al. |
| 10,276,193 B2 | 4/2019 | Narita et al. |
| 10,325,618 B1 | 6/2019 | Wu et al. |
| 10,366,714 B1 | 7/2019 | Olson et al. |
| 10,388,305 B1 | 8/2019 | De Albuquerque et al. |
| 10,446,178 B1 | 10/2019 | Tang et al. |
| 10,580,441 B1 | 3/2020 | Chen et al. |
| 10,593,355 B1 | 3/2020 | Basu et al. |
| 10,706,876 B1 | 7/2020 | Rausch et al. |
| 10,777,219 B1 | 9/2020 | Asif Bashir et al. |
| 10,789,977 B1 | 9/2020 | Song et al. |
| 10,861,485 B1 | 12/2020 | Asif Bashir et al. |
| 10,867,626 B1 | 12/2020 | Li et al. |
| 10,891,974 B1 | 1/2021 | Chembrolu et al. |
| 10,957,348 B2 | 3/2021 | Bai et al. |
| 10,991,390 B2 | 4/2021 | Kobayashi |
| 11,049,515 B1 | 6/2021 | Liu et al. |
| 11,056,134 B1 | 7/2021 | Eppler |
| 11,211,082 B1 | 12/2021 | Sasaki et al. |
| 11,289,117 B1 | 3/2022 | Sasaki et al. |
| 11,508,401 B1 | 11/2022 | Asif Bashir et al. |
| 11,557,314 B1 | 1/2023 | Asif Bashir et al. |
| 11,631,423 B2 | 4/2023 | Nakagawa et al. |
| 11,869,548 B1 * | 1/2024 | Asif Bashir ........... G11B 5/315 |
| 11,881,237 B1 | 1/2024 | Asif Bashir et al. |
| 11,894,026 B1 | 2/2024 | Goncharov et al. |
| 11,900,971 B1 | 2/2024 | Goncharov et al. |
| 2003/0043490 A1 | 3/2003 | Clinton et al. |
| 2005/0280935 A1 | 12/2005 | Clinton et al. |
| 2008/0112087 A1 | 5/2008 | Clinton et al. |
| 2008/0117545 A1 | 5/2008 | Batra et al. |
| 2008/0205202 A1 | 8/2008 | Komura et al. |
| 2008/0239541 A1 | 10/2008 | Shimazawa et al. |
| 2008/0273277 A1 | 11/2008 | Guan et al. |
| 2008/0304176 A1 | 12/2008 | Takagishi et al. |
| 2009/0059423 A1 | 3/2009 | Yamada et al. |
| 2009/0109570 A1 | 4/2009 | Scholz et al. |
| 2009/0147410 A1 | 6/2009 | Jiang et al. |
| 2009/0152119 A1 | 6/2009 | Tachibana et al. |
| 2009/0310244 A1 | 12/2009 | Shimazawa et al. |
| 2013/0114384 A1 | 5/2013 | Mochizuki et al. |
| 2013/0250456 A1 | 9/2013 | Yamada et al. |
| 2014/0139952 A1 | 5/2014 | Takeo et al. |
| 2014/0177092 A1 | 6/2014 | Katada et al. |
| 2014/0177100 A1 | 6/2014 | Sugiyama et al. |
| 2015/0092292 A1 | 4/2015 | Furukawa et al. |
| 2016/0027455 A1 | 1/2016 | Kudo et al. |
| 2016/0118065 A1 | 4/2016 | Chen et al. |
| 2017/0092304 A1 | 3/2017 | Koizumi et al. |
| 2017/0236537 A1 | 8/2017 | Murakami et al. |
| 2018/0268848 A1 | 9/2018 | Narita et al. |
| 2019/0088274 A1 | 3/2019 | Narita et al. |

OTHER PUBLICATIONS

Zhu et al. "Microwave Assisted Magnetic Recording Utilizing Perpendicular Spin Torque Oscillator With Switchable Perpendicular Electrodes," IEEE Transactions on Magnetics, vol. 46, No. 3, Mar. 2010, pp. 751-757.

Mallary et al. "Head and Media Challenges for 3 Tb/in2 Microwave-Assisted Magnetic Recording," IEEE Transactions on Magnetics, vol. 50, No. 7, Jul. 2014, 8 pages.

Katayama et al. "Model Analysis of Tilted Spin-Torque Oscillator With Magnetic Write Head for Shingled Microwave-Assisted Magnetic Recording," IEEE Transactions on Magnetics, vol. 50, No. 11, Nov. 2014, 4 pages.

Ludeman "Three Technologies That Make HDD Magic—Western Digital Blog." Western Digital Corporate Blog, published on Jul. 16, 2020 in Tech & Products, 7 pages, https://blog.westerndigital.com/hdd-magic-20tb-18tb/.

* cited by examiner

MAGNETIC RECORDING DEVICES HAVING EXTERNAL ALTERNATING CURRENT SOURCES

CROSS-REFERENCE TO RELATED APPLICATIONS

This application is a continuation of co-pending U.S. patent application Ser. No. 17/183,161, filed Feb. 23, 2021, which claims benefit of U.S. Provisional Patent Application Ser. No. 63/107,085, filed Oct. 29, 2020. Each of the aforementioned related patent applications is herein incorporated by reference.

BACKGROUND OF THE DISCLOSURE

Field of the Disclosure

Aspects of the present disclosure generally relate to a magnetic recording head assembly, such as a write head of a data storage device, that includes an external alternating current (AC) source for example a magnetic media drive.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic write head at a media facing surface. As the main pole becomes smaller, the writing field becomes smaller as well, limiting the effectiveness of the magnetic write head.

Writing fields and writing performance can also be limited by shunting of spin torque devices—such as spin torque oscillators (STO's), delays in responses to switching, and gap field saturation.

Another challenge for HDD designs where a current is applied through a write head to write data to media is that higher amounts of current can cause a temperature of the write head to increase, which can cause degradation such as at a media facing surface (MFS). The degradation can hinder performance and reliability of the write head, and can even render the write head inoperable. However, lowering currents can limit writing fields.

As discussed, write fields can be limited for data storage devices. Therefore, there is a need for write heads that simply and effectively facilitate write head performance reliability, enhanced magnetic write fields, high areal density capability (ADC) of magnetic recording, high signal-to-noise ratios (SNR's), and reduced jitter.

SUMMARY OF THE DISCLOSURE

Aspects of the present disclosure generally relate to a magnetic recording head assembly that includes an external alternating current (AC) source. A magnetic recording head of the magnetic recording head assembly includes a conductive structure between a main pole and a trailing shield. The conductive structure includes a conductive layer, and the conductive layer is nonmagnetic. The magnetic recording head assembly also includes an external AC source to supply AC current that flows through the conductive structure. In one aspect, the conductive structure is between a coil structure and the trailing shield, and the external AC source is coupled to the coil structure. The conductive structure and the external AC source facilitate consistently providing an enhanced AC writing field to facilitate effective and reliable writing, high ADC, high SNR, and reduced jitter.

In one implementation, a magnetic recording head assembly includes a magnetic recording head. The magnetic recording head includes a lower pole, an upper pole, a main pole between the upper pole and the lower pole, a leading shield on a leading side of the main pole, and a trailing shield on a trailing side of the main pole. The magnetic recording head also includes a conductive structure between the main pole and the trailing shield. The conductive structure includes a conductive layer. The conductive layer is nonmagnetic. The magnetic recording head assembly also includes an alternating current (AC) source coupled to the main pole and the upper pole of the magnetic recording head.

In one implementation, a magnetic recording head assembly includes a magnetic recording head. The magnetic recording head includes a lower pole, an upper pole, a main pole between the upper pole and the lower pole, a leading shield on a leading side of the main pole, and a trailing shield on a trailing side of the main pole. The magnetic recording head also includes a first conductive structure between the main pole and the trailing shield, and a second conductive structure between the main pole and the leading shield. Each of the first conductive structure and the second conductive structure includes a conductive layer. The magnetic recording head assembly also includes an alternating current (AC) source coupled to the lower pole and the upper pole of the magnetic recording head.

In one implementation, a magnetic recording assembly includes a magnetic recording head. The magnetic recording head includes a lower pole and an upper pole. The magnetic recording head also includes a conductive structure between the upper pole and the lower pole. The conductive structure includes a main pole, a first side gap conductive layer, and a second side gap conductive layer. Each of the main pole, the first side gap conductive layer, and the second side gap conductive layer is formed of a conductive material. The magnetic recording head also includes a leading shield on a leading side of the conductive structure, and a trailing shield on a trailing side of the conductive structure. The magnetic recording head assembly also includes an alternating current (AC) source coupled to a first outer side of the conductive structure and a second outer side of the conductive structure to supply AC current horizontally through the conductive structure along a cross-track direction. The second outer side opposes the first outer side along the cross-track direction.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure generally relate to a magnetic recording head assembly that includes an external alternating current (AC) source. A magnetic recording head of the magnetic recording head assembly includes a conductive structure between a main pole and a trailing shield. The conductive structure includes a conductive layer, and the conductive layer is nonmagnetic. The magnetic recording head assembly also includes an external AC source to supply AC current that flows through the conductive structure. In one aspect, the conductive structure is between a coil structure and the trailing shield, and the external AC source is coupled to the coil structure. The conductive structure and the external AC source facilitate consistently providing an enhanced AC writing field to facilitate effective and reliable writing, high ADC, high SNR, and reduced jitter. In one aspect, the magnetic recording head omits a spin torque device (such as an STO) that uses a field generating layer (FGL) and a spin polarizing layer (SPL).

Aspects of the present disclosure relate to data storage devices using an energy-assisted magnetic recording (EAMR) write head.

Figure 1:
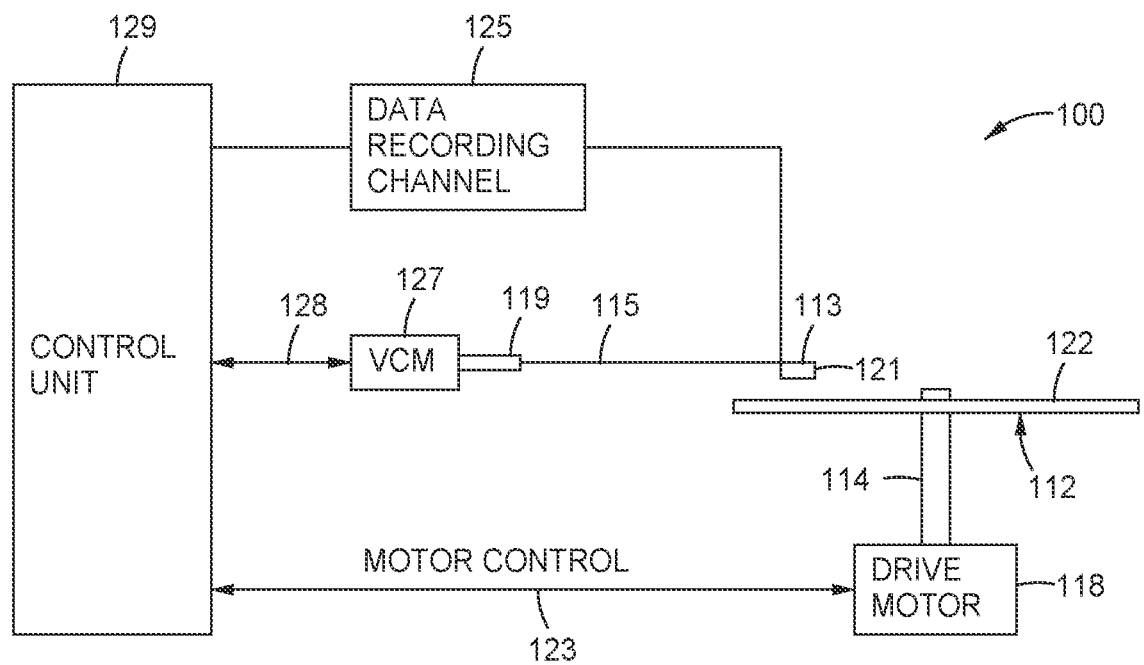
FIG. 1 illustrates a schematic view of a disk drive, according to one implementation.

FIG. 1 illustrates a schematic view of a disk drive 100, according to one implementation. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field. The direction and speed of the coil movements are controlled by the motor current signals supplied by a control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the magnetic media 112 surface by a small, substantially constant spacing during normal operation. The AC magnetic field generated from the magnetic head assembly 121 lowers the coercivity of the high-coercivity media so that the write elements of the magnetic head assemblies 121 may correctly magnetize the data bits in the magnetic media 112.

The various components of the disk drive 100 are controlled in operation by control signals generated by the control unit 129, such as access control signals and internal clock signals. The control unit 129 can include logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on the magnetic media 112. Write and read signals are communicated to and from write and read heads on the magnetic head assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
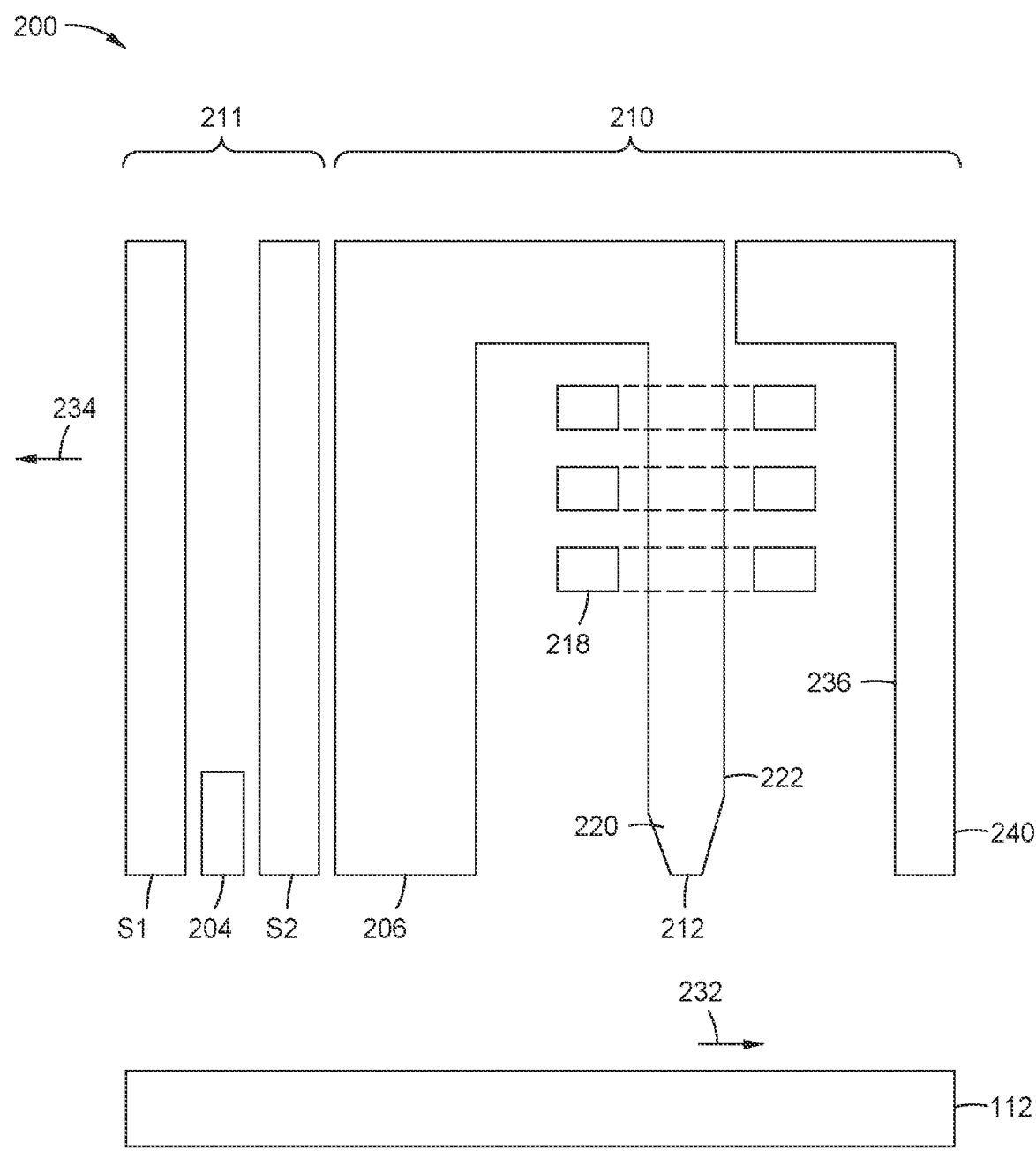
FIG. 2 is a fragmented and schematic cross-sectional side view through a center of a read/write head facing the magnetic media, according to one implementation.

FIG. 2 is a fragmented and schematic cross-sectional side view through a center of a read/write head 200 facing the magnetic media 112, according to one implementation. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head. In FIG. 2, the magnetic media 112 moves past the write head 210 in the direction indicated by the arrow 232 such that the read/write head 200 moves relative to the magnetic media 112 in the direction indicated by the arrow 234.

In one embodiment, which can be combined with other embodiments, the magnetic read head 211 is a magnetoresistive (MR) read head that includes an MR sensing element 204 located between MR shields S1 and S2. In one embodiment, which can be combined with other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap and a leading gap may be in contact with the main pole, and a leading shield may be in contact with the leading gap. A recording magnetic field (e.g., a write field) is generated from the main pole 220 and the trailing shield 240 facilitates making the magnetic field gradient of the main pole 220 steep. The main pole 220 may be a magnetic material such as an FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, which can be combined with other embodiments, the main pole 220 has a saturated magnetization (Ms) of 2.4 T and a thickness of about 300 nanometers (nm). The trailing shield 240 may be a magnetic material such as NiFe alloy. In one embodiment, which can be combined with other embodiments, the trailing shield 240 has an Ms of about 1.6 T.

Figure 3A:
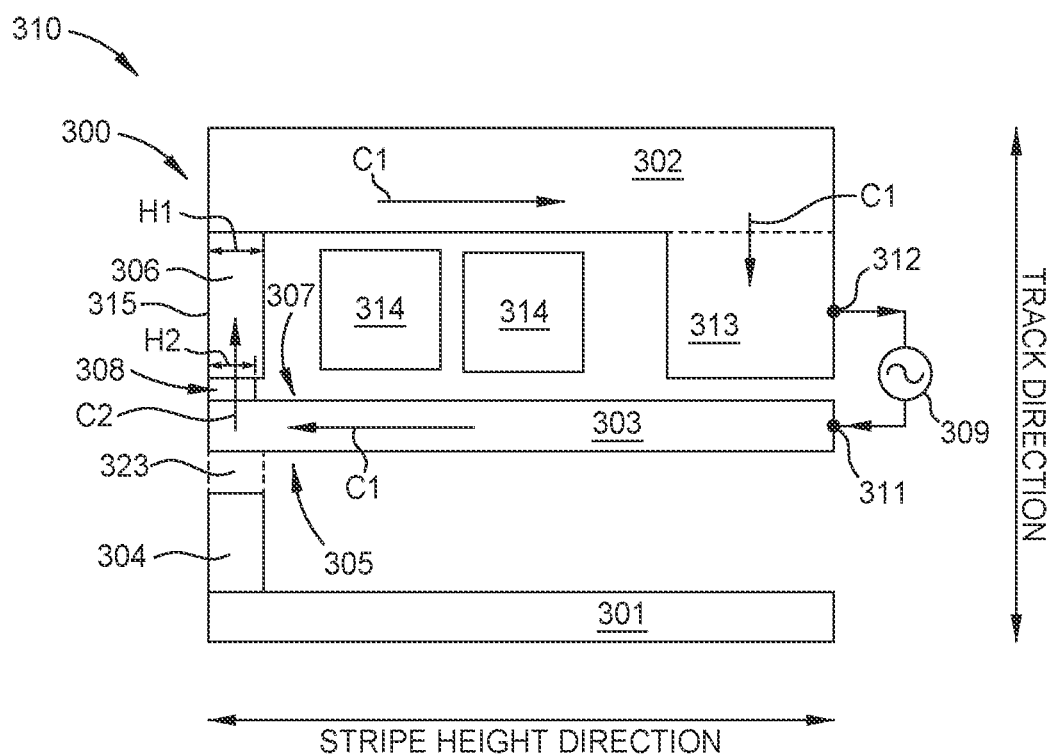
FIG. 3A is a schematic cross-sectional throat view of a magnetic recording head assembly, according to one implementation.

FIG. 3A is a schematic cross-sectional throat view of a magnetic recording head assembly 310, according to one implementation. The magnetic recording head assembly 310 may be used in a magnetic recording device, such as a hard disk drive (HDD). In one embodiment, which can be combined with other embodiments, the magnetic recording head assembly 310 is used as at least part of the write head 210 shown in FIG. 2.

It is to be understood that the magnetic recording head discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

The magnetic recording head assembly 310 includes a magnetic recording head 300. The magnetic recording head 300 includes a lower pole 301, an upper pole 302, and a main pole 303 between the upper pole 302 and the lower pole 301. The magnetic recording head 300 also includes a leading shield 304 on a leading side 305 of the main pole 303, and a trailing shield 306 on a trailing side 307 of the main pole 303. The magnetic recording head 300 includes a conductive structure 308 between the main pole 303 and the trailing shield 306. The magnetic recording head 300 includes a media facing surface (MFS) 315, such as an air bearing surface (ABS). The conductive structure 308 extends to the MFS 315.

The trailing shield 306 is of a height H1 along the stripe height direction. The height H1 is of 0.5 microns (500 nanometers) or less, such as about 500 nanometers. A portion of the trailing shield 306, such as a portion of the trailing shield 306 that is adjacent to the main pole 303, includes a height H2 that is less than the height H1. A nonmagnetic gap (shown as occupied by the conductive structure 308 in FIG. 3A) may be disposed between the main pole 303 and the portion of the trailing shield 306 having the height H2. The height H2 is within a range of 20 nm to 200 nm. In such an embodiment, an electrical stripe height of the magnetic recording head assembly 310 is equal to or greater than a magnetic stripe height of the magnetic recording head assembly 310. In such an embodiment, the electrical stripe height is decoupled from the magnetic stripe height. In one embodiment, which can be combined with other embodiments, the height H2 is the same as the height H1.

The magnetic recording head assembly 310 also includes an alternating current (AC) source 309 coupled to the main pole 303 and the upper pole 302 of the magnetic recording head 300. The AC source 309 includes a first lead 311 coupled to the main pole 303 to supply current C1 to the main pole 303, and a second lead 312 coupled to the upper pole 302 to receive current C1 returned from the upper pole 302. The current C1 is supplied during writing operations using the main pole 303. The current C1 is a bias current (a secondary current) that is supplied independently of a write current that generates a write field to write magnetic media. In one embodiment, which can be combined with other embodiments, the current C1 is supplied at a bias frequency within a range of 0 GHz to 25 GHz, and the write current is supplied at a write frequency within a range of 1.0 GHz to 1.5 GHz as a 1 T frequency. The current C1 is an alternating current. In one embodiment, which can be combined with other embodiments, the current C1 is supplied by the AC source 309 at a frequency that is within a range of 10 GHz to 25 GHz. The current C1 supplied by the AC source 309 flows through the main pole 303, through the conductive structure 308, and to the trailing shield 306. The current C1 flows through the conductive structure 308, through the upper pole 302, and returns to the AC source 309. In this case, the upper pole 302 serves as an upper return pole. In one embodiment, which can be combined with other embodiments, the upper pole 302 includes a ledge 313 that protrudes from the upper pole 302 and toward the main pole 303. The magnetic recording head 300 includes a coil structure 314. The coil structure 314 can be a "pancake" structure that winds around the trailing side 307 of the main pole 303, or can be a "helical" structure that winds around the main pole 303. The AC source 309 is disposed externally to the magnetic recording head 300, in one embodiment. The AC source 309 is disposed externally to the lower pole 301, the main pole 303, and the upper pole 302, in one embodiment. The AC source 309 is disposed externally to the conductive structure 308, the leading shield 304, and the trailing shield 306, in one embodiment. In another embodiment, the AC source 309 is disposed externally to a hat of the writer head device of which the magnetic recording head 300 is a part.

Figure 3B:
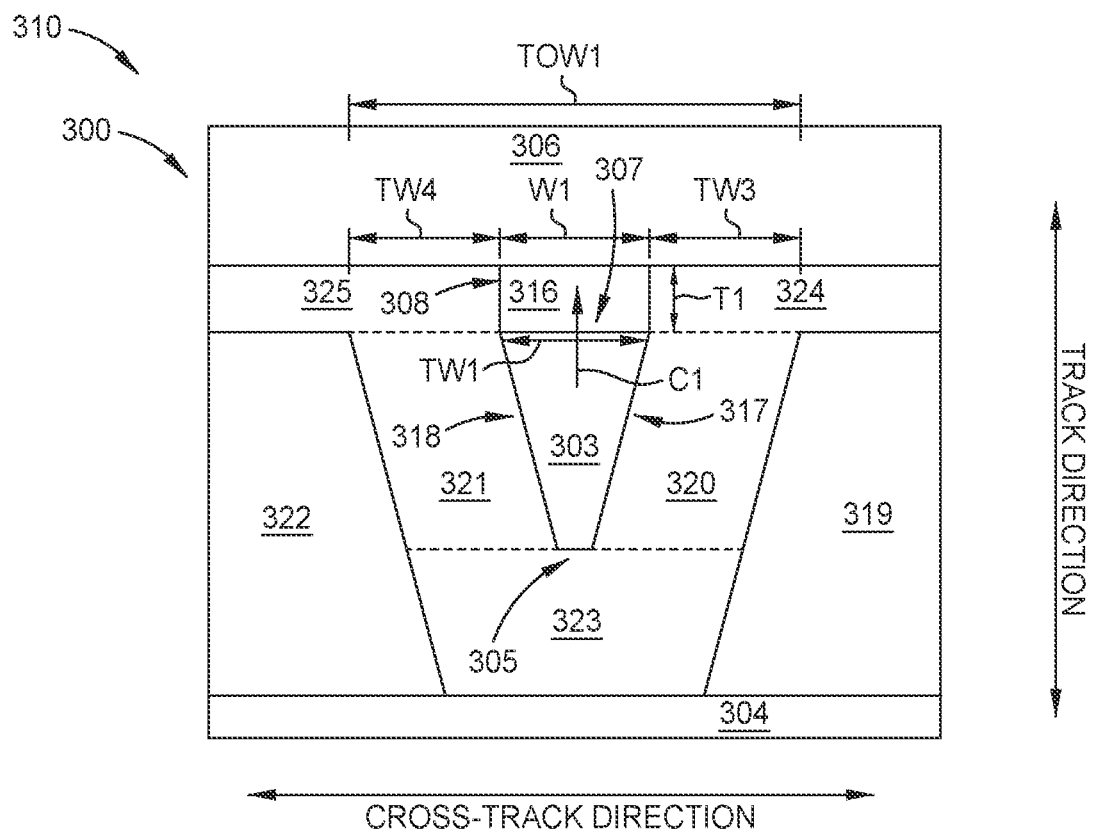
FIG. 3B is a schematic media facing surface cross-sectional view of the magnetic recording head assembly shown in FIG. 3A, according to one implementation.

FIG. 3B is a schematic media facing surface cross-sectional view of the magnetic recording head assembly 310 shown in FIG. 3A, according to one implementation. The conductive structure 308 includes one or more conductive layers 316 (one is shown) disposed between the main pole 303 and the trailing shield 306. The conductive layers 316 are nonmagnetic. In one embodiment, which can be combined with other embodiments, the conductive layers 316 includes a plurality of conductive layers having differing resistivity values. The conductive structure 308 is of a width W1 along a cross-track direction that is about equal to a trailing width TW1 of the main pole 303 along the cross track direction. The conductive structure 308 is of a thickness T1 along a track direction. In one embodiment, which can be combined with other embodiments, the width W1 is within a range of 20 nm to 500 nm. Each of the one or more conductive layers 316 is formed of one or more of ruthenium (Ru), chromium (Cr), tantalum (Ta), gold (Au), copper (Cu), nickel-chrome (NiCr), nickel-aluminum (NiAl), nickel-tantalum (NiTa), and/or nickel-iron-tantalum (NiFeTa).

The magnetic recording head 300 includes a first side gap 320 disposed on a first side 317 of the main pole 303, and a first side shield 319 disposed on the first side 317 of the main pole 303. The first side gap 320 is disposed between the main pole 303 and the first side shield 319. The magnetic recording head 300 includes a second side gap 321 disposed on a second side 318 of the main pole 303, and a second side shield 322 disposed on the second side 318 of the main pole 303. The second side gap 321 is disposed between the main pole 303 and the second side shield 322. The magnetic recording head 300 also includes a leading side gap 323 disposed on the leading side 305 of the main pole 303. The leading side gap 323 is disposed between the main pole 303 and the leading shield 304. The current C1 flowing through the main pole 303 flows upward along the track direction from the main pole 303, through the conductive structure 308, and into the trailing shield 306.

In one embodiment, which can be combined with other embodiments, the width W1 can be up to (such as equal to) a total width TOW1, where the total width TOW1 includes the trailing width TW1, a trailing width TW3 of the first side gap 320, a first overhang length, a trailing width TW4 of the second side gap 321, and a second overhang length added together. In one example, the first overhang length is a length by which the conductive structure 308 extends to the right past the first side gap 320 along the cross-track direction. In one example, the second overhang length is a length by which the conductive structure 308 extends to the left past the second side gap 321 along the cross-track direction. In FIG. 3B, the total width TOW1 is illustrated without the first overhang length and the second overhang length. The present disclosure contemplates that the first overhang length and the second overhang length may be present and a part of the total width TOW1.

The present disclosure contemplates that the first side gap 320 can extend to the right and into the first side shield 319 such that the trailing width TW3 can extend to the right. The present disclosure contemplates that the first side gap 320 can extend to the right and into the first side shield 319 through the entire width of the first side shield 319 along the cross-track direction. The present disclosure contemplates that the second side gap 321 can extend to the left and into the second side shield 322 such that the trailing width TW4 can extend to the left. The present disclosure contemplates that the second side gap 321 can extend to the left and into the second side shield 322 through the entire width of the second side shield 322 along the cross-track direction.

The magnetic recording head includes a first side insulation layer 324 disposed on a first side (corresponding to the first side 317) of the conductive structure 308, and a second side insulation layer 325 disposed on a second side (corresponding to the second side 318) of the conductive structure 308. The first side insulation layer 324 is disposed between the first side shield 319 and the first side gap 320 (on one side of the first side insulation layer 324) and the trailing shield 306. The second side insulation layer 325 is disposed between the second side shield 322 and the second side gap 321 (on another side of the second side insulation layer 325) and the trailing shield 306. Each of the first side insulation layer 324 and the second side insulation layer 325 is formed of an insulation material. The insulation material includes one or more of an aluminum oxide (AlO), a silicon nitride (SiN), and/or a tantalum nitride (TaN). If the conductive layers 316 have a wider cross-track width than depicted in FIG. 3B, per the options explained above, the insulation layers will be of different widths than shown or omitted to accommodate the conductive layers.

Figure 3C:
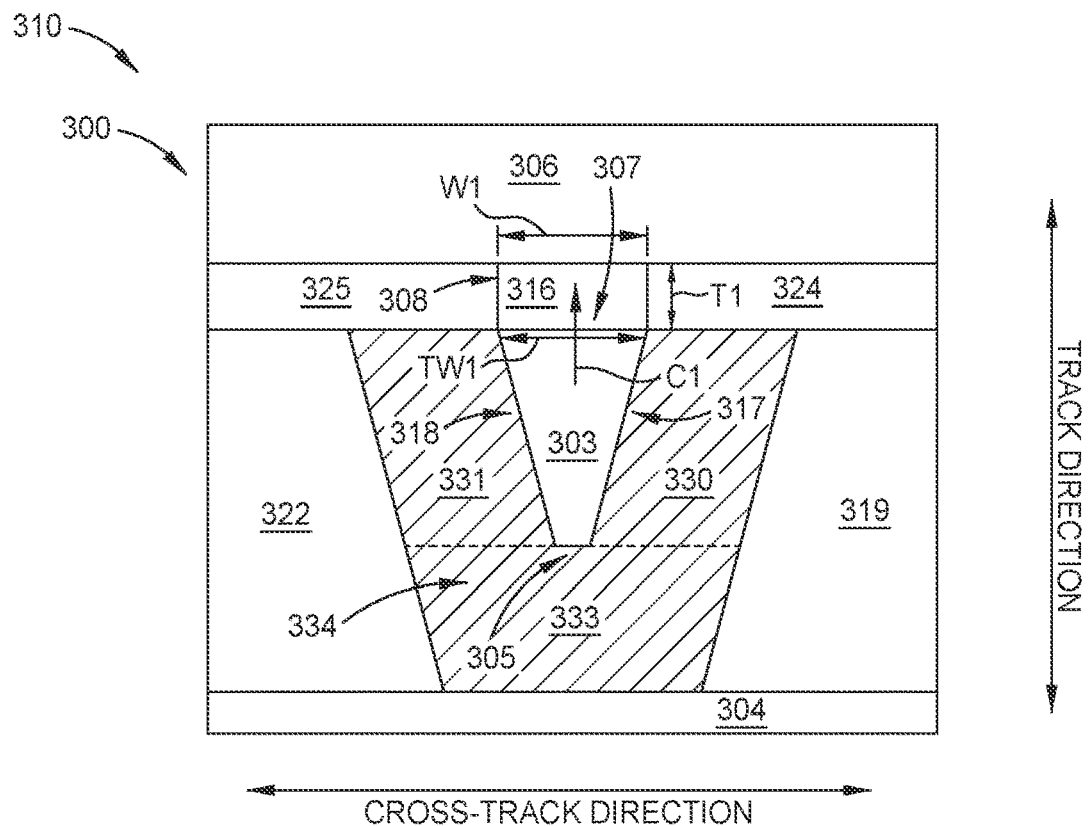
FIG. 3C is a schematic media facing surface cross-sectional view of the magnetic recording head assembly shown in FIG. 3A, according to one implementation.

FIG. 3C is a schematic media facing surface cross-sectional view of the magnetic recording head assembly 310 shown in FIG. 3A, according to one implementation. FIG. 3C provides a similar view as FIG. 3B, with the side gap layers in cross-hatch to highlight the side gap layers for discussion below. In the implementation shown in FIG. 3C, the magnetic recording head 300 includes a first side gap layer 330 disposed on the first side 317 of the main pole 303. The first side gap layer 330 is disposed between the main pole 303 and the first side shield 319. In the implementation shown in FIG. 3C, the magnetic recording head includes a second side gap layer 331 disposed on the second side 318 of the main pole 303. The second side gap layer 331 is disposed between the main pole 303 and the second side shield 322. In the implementation shown in FIG. 3C, the magnetic recording head 300 includes a leading gap layer 333 disposed on the leading side 305 of the main pole 303. The leading gap layer 333 is disposed between the main pole 303 and the leading shield 304. In one embodiment, which can be combined with other embodiments, the first side gap layer 330, the second side gap layer 331, and the leading gap layer 333 are part of an integral gap layer 334 disposed about the first side 317, the leading side 305, and the second side 318 of the main pole 303.

The first side gap layer 330, the second side gap layer 331, and the leading gap layer 333 occupy the first side gap 320, the second side gap 321, and the leading side gap 323 shown in FIG. 3B, respectively. The first side gap layer 330, the second side gap layer 331, and the leading gap layer 333 can operate as a heat sink to receive heat from the main pole 303 to facilitate preventing the main pole 303 from overheating during writing operations. The first side gap layer 330, the second side gap layer 331, and the leading gap layer 333 can each be formed of a conductive material—such as aluminum (Al)—or can be formed of an insulation material—such as one or more of an aluminum oxide (AlO), a silicon nitride (SiN), and/or a tantalum nitride (TaN). In one embodiment, which can be combined with other embodiments, each of the first side gap layer 330, the second side gap layer 331, and the leading gap layer 333 is nonmagnetic. In one embodiment, which can be combined with other embodiments, each of the first side gap layer 330, the second side gap layer 331, and the leading gap layer 333 is formed of a heat sink material that includes a low resistivity material, such as copper (Cu) and/or gold (Au).

Figure 4A:
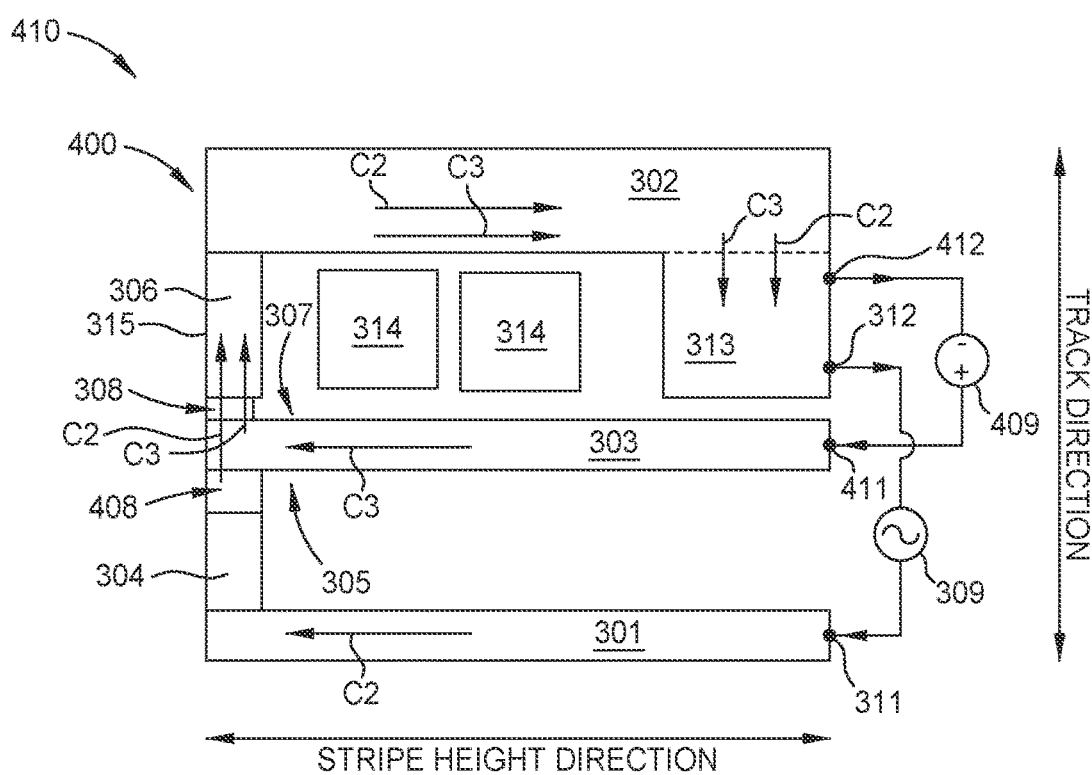
FIG. 4A is a schematic cross-sectional throat view of a magnetic recording head assembly, according to one implementation.

FIG. 4A is a schematic cross-sectional throat view of a magnetic recording head assembly 410, according to one implementation. The magnetic recording head assembly 410 may be used in a magnetic recording device, such as a hard disk drive (HDD). In one embodiment, which can be combined with other embodiments, the magnetic recording head assembly 410 is used as at least part of the write head 210 shown in FIG. 2. The magnetic recording head assembly 410 is similar to the magnetic recording head 300 shown in FIGS. 3A-3C, and includes one or more of the aspects, features, components, and/or properties thereof.

The magnetic recording head assembly 410 includes a magnetic recording head 400. The conductive structure 308 of the magnetic recording head 400 is a first conductive structure. The magnetic recording head 400 includes a second conductive structure 408 disposed on the leading side 305 of the main pole 303. The second conductive structure 408 is disposed between the main pole 303 and the leading shield 304. In the implementation shown in FIG. 4A, the first lead 311 of the AC source 309 is coupled to the lower pole 301 to supply current C2 to the lower pole 301. The current C2 is supplied during writing operations using the main pole 303. The current C2 is an alternating current. The current C2 is a bias current (a secondary current) that is supplied independently of the write current that generates the write field to write magnetic media. In one embodiment, which can be combined with other embodiments, the current C2 is supplied at a bias frequency within a range of 0 GHz to 25 GHz, and the write current is supplied at a write frequency within a range of 1.0 GHz to 1.5 GHz. In one embodiment, which can be combined with other embodiments, the current C2 is supplied by the AC source 309 at a frequency that is within a range of 10 GHz to 25 GHz. The current C2 flows through the lower pole 301, through the second conductive structure 408, through the main pole 303, through the conductive structure 308, and to the trailing shield 306. The current C2 flows through the trailing shield 306, through the upper pole 302, through the ledge 313, and to the second lead 312 of the AC source 309.

In one embodiment, which can be combined with other embodiments, the magnetic recording head assembly 410 includes a direct current (DC) source 409. The DC source 409 is a second current source. The DC source 409 includes a first lead 411 coupled to the main pole 303 to supply current C3 to the main pole 303, and a second lead 412 coupled to the upper pole 302 to receive current C3 returned from the upper pole 302. The second lead 412 is coupled to the ledge 313 of the upper pole 302. The current C3 is a direct current. The current C3 is supplied during writing operations using the main pole 303. The current C3 is a bias current (a secondary current) that is supplied independently of a write current that generates a write field to write magnetic media. The current C3 supplied by the DC source 409 flows through the main pole 303, through the conductive structure 308, and to the trailing shield 306. The current C3 flows through the conductive structure 308, through the upper pole 302, and returns to the DC source 409. The current returns to the second lead 412 of the DC source 409 through the ledge 313 of the upper pole 302. In one embodiment, each of the DC source 409 and the AC source 309 may include a silicon chip. In one embodiment, which can be combined with other embodiments, the first lead 311 and the first lead 411 are swapped such that the first lead 311 is coupled to the main pole 303 and the first lead 411 is coupled to the lower pole 301, and the currents C2 and C3 are re-routed accordingly.

Figure 4B:
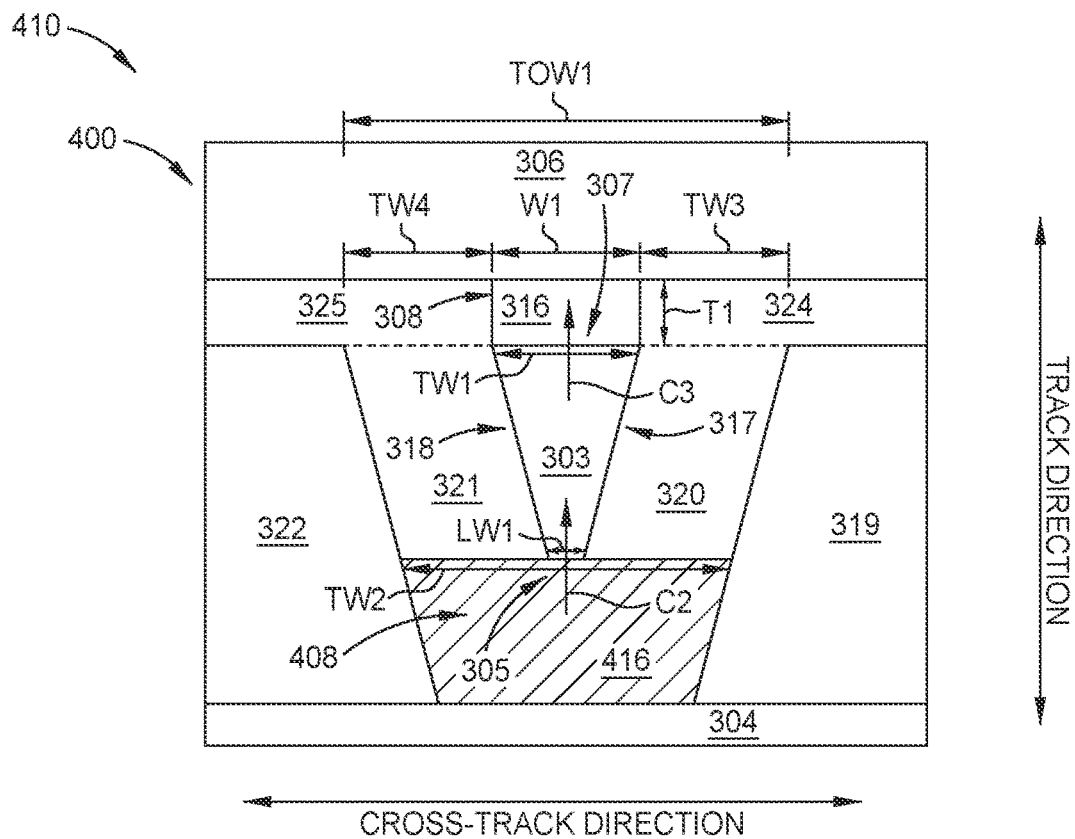
FIG. 4B is a schematic media facing surface cross-sectional view of the magnetic recording head assembly shown in FIG. 4A, according to one implementation.

FIG. 4B is a schematic media facing surface cross-sectional view of the magnetic recording head assembly 410 shown in FIG. 4A, according to one implementation. The second conductive structure 408 includes one or more conductive layers 416 (one is shown) disposed between the main pole 303 and the leading shield 304. The conductive layers 416 are nonmagnetic. The second conductive structure 408 is of a trailing width TW2 along a cross-track direction that is greater than a leading width LW1 of the main pole 303 along the cross track direction. In one embodiment, which can be combined with other embodiments, the trailing width TW2 is within a range of 20 nm to 500 nm. Each of the one or more conductive layers 416 is formed of one or more of ruthenium (Ru), chromium (Cr), tantalum (Ta), gold (Au), copper (Cu), nickel-chrome (NiCr), nickel-aluminum (NiAl), nickel-tantalum (NiTa), and/or nickel-iron-tantalum (NiFeTa). The second conductive structure 408 is between the first side shield 319 and the second side shield 322. The second conductive structure 408 occupies the leading side gap 323 shown in FIG. 3B.

The width W1 of the one or more conductive layers 316 of the conductive structure 308 can be modified as discussed for example in relation to FIG. 3B.

The current C3 flowing through the main pole 303 flows upward along the track direction from the main pole 303, through the conductive structure 308, and into the trailing shield 306. The current C2 flowing through the lower pole 301 flows upward along the track direction from the lower pole 301, through the leading shield 304, through the second conductive structure 408, through the main pole 303, through the first conductive structure 308, and into the trailing shield 306.

Figure 4C:
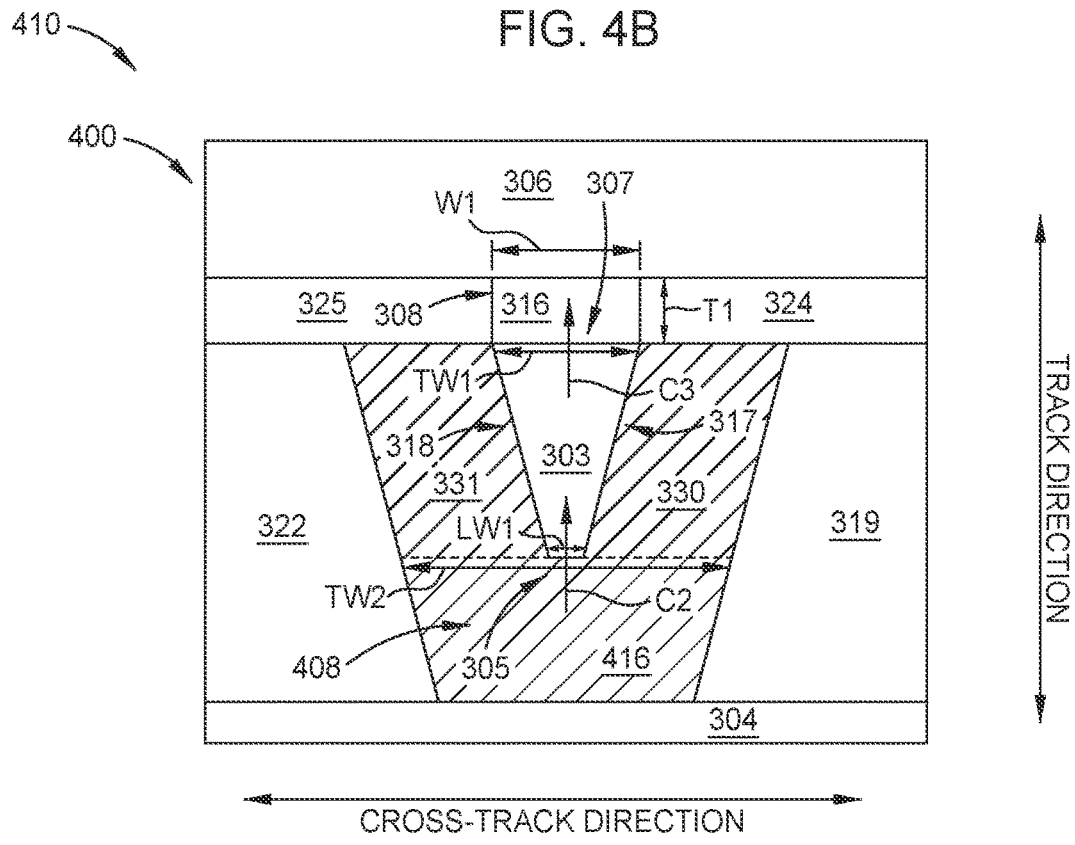
FIG. 4C is a schematic media facing surface cross-sectional view of the magnetic recording head assembly shown in FIG. 4A, according to one implementation.

FIG. 4C is a schematic media facing surface cross-sectional view of the magnetic recording head assembly 410 shown in FIG. 4A, according to one implementation. In the implementation shown in FIG. 4C, the magnetic recording head 400 includes the first side gap layer 330 disposed on the first side 317 of the main pole 303 and the second side gap layer 331 disposed on the second side 318 of the main pole 303. The first side gap layer 330 is disposed between the second conductive structure 408 and the first side insulation layer 324. The second side gap layer 331 is disposed between the second conductive structure 408 and the second side insulation layer 325. The leading gap layer 333 is omitted in the implementation shown in FIG. 4C as the second conductive structure 408 occupies the leading side gap 323 shown in FIG. 3B.

Figure 5A:
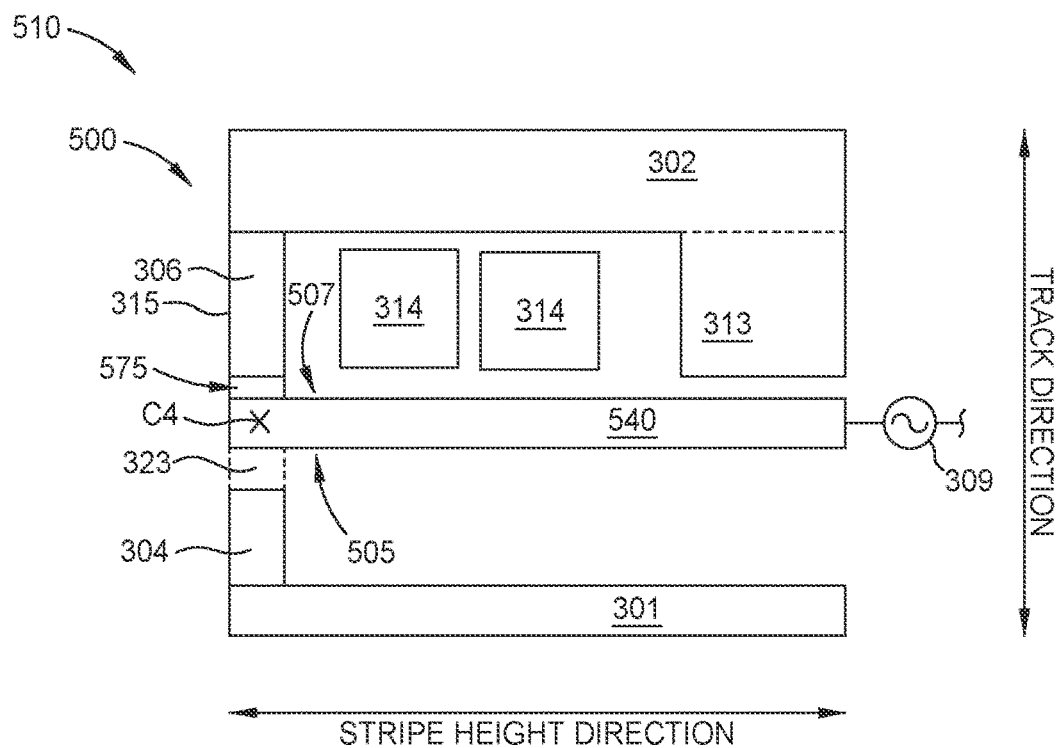
FIG. 5A is a schematic cross-sectional throat view of a magnetic recording head assembly, according to one implementation.

FIG. 5A is a schematic cross-sectional throat view of a magnetic recording head assembly 510, according to one implementation. The magnetic recording head assembly 510 may be used in a magnetic recording device, such as a hard disk drive (HDD). In one embodiment, which can be combined with other embodiments, the magnetic recording head assembly 510 is used as at least part of the write head 210 shown in FIG. 2. The magnetic recording head assembly 510 is similar to the magnetic recording head assembly 310 shown in FIGS. 3A-3C, and includes one or more of the aspects, features, components, and/or properties thereof.

Figure 5B:
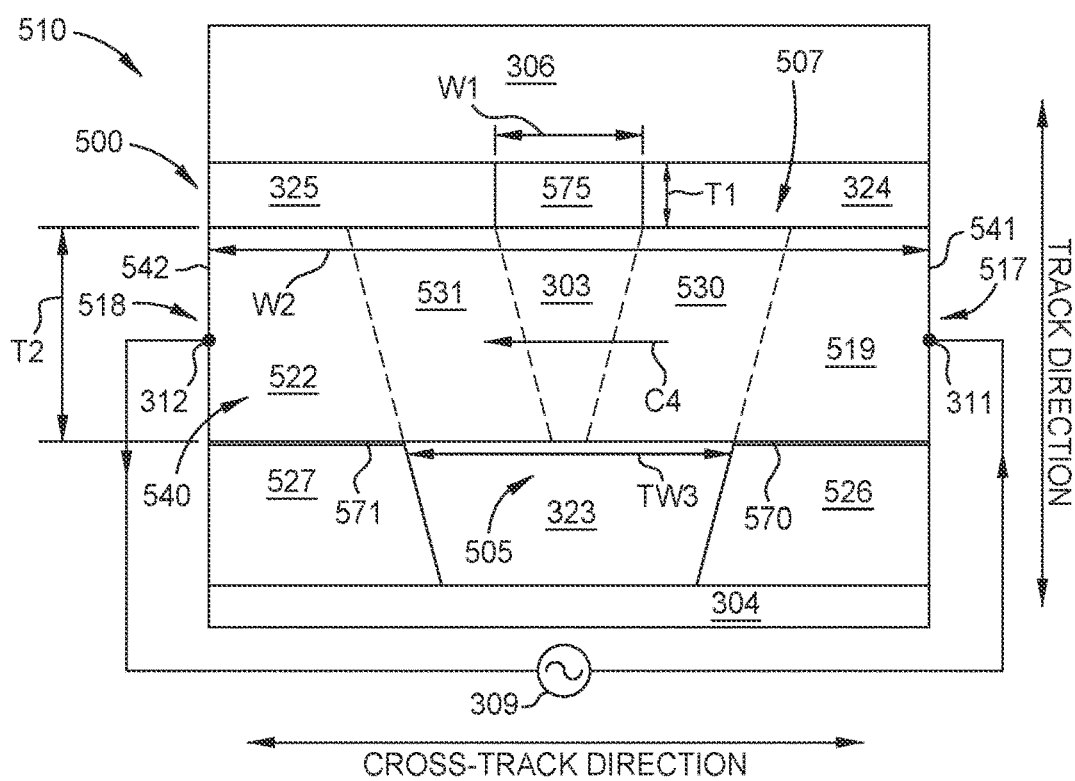
FIG. 5B is a schematic media facing surface cross-sectional view of the magnetic recording head assembly shown in FIG. 5A, according to one implementation.

FIG. 5B is a schematic media facing surface cross-sectional view of the magnetic recording head assembly 510 shown in FIG. 5A, according to one implementation.

The magnetic recording head assembly 510 includes a magnetic recording head 500. The magnetic recording head 500 includes a conductive structure 540 (including the main pole 303) between the upper pole 302 and the lower pole 301. In the implementation shown in FIG. 5B, the conductive structure 308 having the one or more conductive layers 316 is replaced with a trailing insulation layer 575. The conductive structure 540 is disposed between the coil structure 314 and the lower pole 301. The leading shield 304 is disposed on a leading side 505 of the conductive structure 540, and the trailing shield 306 is disposed on a trailing side 507 of the conductive structure 540. The trailing insulation layer 575 is disposed between the conductive structure 540 and the trailing shield 306. The leading side gap 323 is disposed on the leading side 505 of the conductive structure 540. The first lead 311 of the AC source 309 is coupled to the a first outer side 541 of the conductive structure 540, and the second lead 312 of the AC source 309 is coupled to a second outer side 542 of the conductive structure 540 to supply current C4 to the conductive structure 540. The current C4 is an AC current. The current C4 is supplied to the conductive structure 540 through the first lead 311. The current C4 is supplied during writing operations using the magnetic recording head 500. The current C4 is a bias current (a secondary current) that is supplied independently of the write current that generates the write field to write magnetic media. In one embodiment, which can be combined with other embodiments, the current C4 is supplied at a bias frequency within a range of 0 GHz to 25 GHz, and the write current is supplied at a write frequency within a range of 1.0 GHz to 1.5 GHz.

The coil structure 314 is a primary current structure (a write current structure) that uses the write current to activate the main pole 303 within the conductive structure 540 to write magnetic media. The coil structure 314 receives the write current from an internal current source that is independent of the AC source 309. The conductive structure 540 is a secondary current structure (a bias current structure) that uses the current C4 (a bias current) independently of the write current to facilitate writing operations. The AC source 309 supplies the current C4 independently of the write current.

The current C4 flows horizontally through the conductive structure 540 (which includes the main pole 303, a first side gap conductive layer 530, a second side gap conductive layer 531, a first side shield 519 and a second side shield 522) along the cross-track direction from the first lead 311 and to the second lead 312. The second outer side 542 opposes the first outer side 541 along the cross-track direction. The width W1 of the trailing insulation layer 575 is lesser than a width W2 of the conductive structure 540 along the cross-track direction. The width W2 of the conductive structure 540 is greater than a trailing width W3 of the leading side gap 323. The conductive structure 540 is of a thickness T2 along the track direction. The width W2 can be as wide as a width between outer sides of writer shields 519 and 522. The thickness T2 may be equal to a thickness of the main pole 303 along the track direction. In one embodiment, which can be combined with other embodiments, the thickness T2 is within a range of 50 nm to 150 nm.

The conductive structure 540 includes the main pole 303, the first side gap conductive layer 530, and the second side gap conductive layer 531. The conductive structure 540 also includes the first side shield 519 and the second side shield 522. A leading portion 526 of the first side shield 519 and a leading portion 527 of the second side shield 522 are disposed on the leading side 505 of the conductive structure 540. The leading side gap 323 is disposed between the leading portion of the first side shield 519 and the leading portion 527 of the second side shield 522. Each of the main pole 303, the first side gap conductive layer 530, the second side gap conductive layer 531, the first side shield 519, and the second side shield 522 are formed of a conductive material and are insulated, such as insulated on a media facing surface side thereof.

The first side shield 519 includes an insulation layer 570 embedded in the first side shield 519 to define a current flow boundary for the first side shield 519, and the second side shield 522 includes an insulation layer 571 embedded in the second side shield 522 to define a current flow boundary for the second side shield 522. The embedded insulation layers 570, 571 are lower flow limits of the respective first and second side shield 519, 522 below which the current C4 will not flow as the current C4 flows through the respective first or second side shield 519, 522.

In one embodiment, which can be combined with other embodiments, the first side shield 519 and the second side shield 522 are formed of a conductive material that is magnetic, such as NiFe20 or NiFe65. In one embodiment, which can be combined with other embodiments, the first side gap conductive layer 530 and the second side gap conductive layer 531 are formed of a conductive material such as one or more of Cu, Ru, NiCr, and/or NiTa. In one embodiment, which can be combined with other embodiments, the main pole 303 is formed of a conductive but magnetic material such as CoFe.

In FIG. 5A, the flow of the current C4 is denoted with an "X" as the current C4 is flowing into the page in FIG. 5A.

Figure 6A:
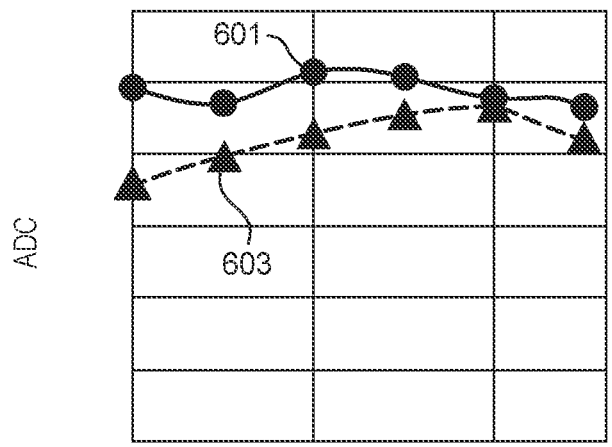
FIG. 6A is a schematic graph showing ADC (Areal Density Capability) relative to frequency, according to one implementation.

FIG. 6A is a schematic graph showing ADC (Areal Density Capability) relative to frequency, according to one implementation. A first case 601 plots the ADC of a magnetic recording head using an external current source, such as an external AC source described herein. For the first case 601, the frequency of the horizontal axis is a frequency for a bias current supplied using the external current source. A second case 603 plots the ADC of a magnetic recording head having a field-generating layer (FGL) within a spin torque oscillator (STO) in the write gap rather than the external current source implementation of the first case 601. For the second case 603, the frequency of the horizontal axis is a frequency of a current applied to the STO with the field-generating layer (FGL). The first case 601 exhibits a higher ADC relative to the second case 603 across a range of frequencies, such as a range of 0 GHz to 30 GHz (for example a range of 10 GHz to 25 GHz).

Figure 6B:
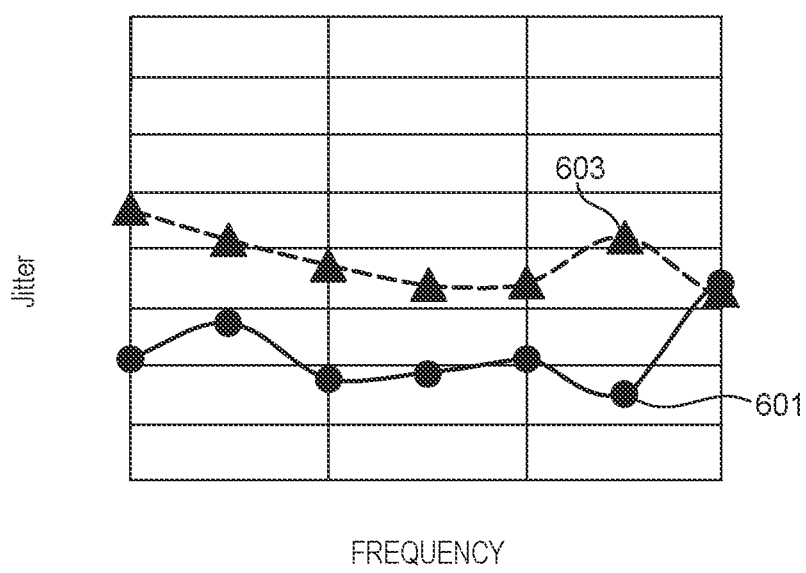
FIG. 6B is a schematic graph showing jitter relative to frequency, according to one implementation.

FIG. 6B is a schematic graph showing jitter relative to frequency, according to one implementation. The first case 601 plots the jitter of the magnetic recording head described in relation to FIG. 6A where an external current source is used. For the first case 601, the frequency of the horizontal axis is a frequency for a bias current supplied using the external current source. The second case 603 plots the jitter of the magnetic recording head described in relation to FIG. 6A having a field-generating layer (FGL) within a spin torque oscillator (STO) in the write gap rather than the external current source implementation of the first case 601. For the second case 603, the frequency of the horizontal axis is a frequency of a current applied to the STO with the field-generating layer (FGL). The first case 601 exhibits a lower jitter relative to the second case 603 across a range of frequencies, such as a range of 0 GHz to 30 GHz (for example a range of 10 GHz to 25 GHz).

Benefits of the present disclosure include simple and effective facilitated magnetic recording performance and reliability; consistent and continuous application of AC writing fields; increased ADC for magnetic recording at operating current densities; reduced jitter; reduced voltage or current while maintaining or facilitating increased moment-thickness product; and increased SNR. AC field is applied even when the writer switches such that linearly polarized AC field is applied to media at all times during writing operations. Additionally, a chirality change is not required as the writer switches. Moreover, the AC source is decoupled from the base writer.

It is contemplated that one or more aspects disclosed herein may be combined. Moreover, it is contemplated that one or more aspects disclosed herein may include some or all of the aforementioned benefits. As an example, aspects, components, features, and/or properties of the various magnetic recording heads 300, 400, 500 described herein (including the magnetic recording head 300 implementation shown in FIG. 3B and the magnetic recording head 300 implementation shown in FIG. 3C) may be combined for a magnetic recording head (such as a write head of an HDD).

In one embodiment, a magnetic recording head assembly comprises a magnetic recording head. The magnetic recording head comprises a lower pole, an upper pole, a main pole between the upper pole and the lower pole, a leading shield on a leading side of the main pole, and a trailing shield on a trailing side of the main pole. The magnetic recording head also includes a conductive structure between the main pole and the trailing shield. The conductive structure includes a conductive layer. The conductive layer is nonmagnetic. The magnetic recording head assembly also includes an alternating current (AC) source coupled to the main pole and the upper pole of the magnetic recording head. The AC source supplies AC current to the main pole and receives AC current returned from the upper pole. The AC source supplies AC current at a frequency, and the frequency is within a range of 10 GHz to 25 GHz. The conductive structure is of a width along a cross-track direction that is about equal to a trailing width of the main pole along the cross track direction. The conductive layer is formed of one or more of ruthenium (Ru), chromium (Cr), tantalum (Ta), gold (Au), copper (Cu), nickel-chrome (NiCr), nickel-aluminum (NiAl), nickel-tantalum (NiTa), and/or nickel-iron-tantalum (NiFeTa). The AC source is disposed externally to the lower pole, the main pole, and the upper pole. In one example, which can be combined with other examples, the magnetic recording head includes a first side gap disposed on a first side of the main pole and between the main pole and a first side shield, a second side gap disposed on a second side of the main pole and between the main pole and a second side shield, and a leading side gap disposed on a leading side of the main pole and between the main pole and the leading shield. In one example, which can be combined with other examples, the magnetic recording head includes a first side gap layer disposed on a first side of the main pole and between the main pole and a first side shield, a second side gap layer disposed on a second side of the main pole and between the main pole and a second side shield, and a leading gap layer disposed on a leading side of the main pole and between the main pole and the leading shield. A magnetic recording device including the magnetic recording head assembly is also disclosed.

In one embodiment, a magnetic recording head assembly comprises a magnetic recording head. The magnetic recording head comprises a lower pole, an upper pole, a main pole between the upper pole and the lower pole, a leading shield on a leading side of the main pole, and a trailing shield on a trailing side of the main pole. The magnetic recording head also includes a first conductive structure between the main pole and the trailing shield, and a second conductive structure between the main pole and the leading shield. Each of the first conductive structure and the second conductive structure includes a conductive layer. The magnetic recording head assembly also includes an alternating current (AC) source coupled to the lower pole and the upper pole of the magnetic recording head. The conductive layer of each of the first conductive structure and the second conductive structure is nonmagnetic. The AC source supplies AC current to the lower pole and receives AC current returned from the upper pole. The magnetic recording head assembly also includes a direct current (DC) source coupled to the main pole and the upper pole of the magnetic recording head. The second conductive structure is of a trailing width along a cross-track direction that is greater than a leading width of the main pole along the cross track direction. In one example, the trailing width is within a range of 20 nm to 500 nm. A magnetic recording device including the magnetic recording head assembly is also disclosed.

In one implementation, a magnetic recording assembly includes a magnetic recording head. The magnetic recording head includes a lower pole and an upper pole. The magnetic recording head also includes a conductive structure between the upper pole and the lower pole. The conductive structure includes a main pole, a first side gap conductive layer, and a second side gap conductive layer. Each of the main pole, the first side gap conductive layer, and the second side gap conductive layer is formed of a conductive material. The magnetic recording head also includes a leading shield on a leading side of the conductive structure, and a trailing shield on a trailing side of the conductive structure. The magnetic recording head assembly also includes an alternating current (AC) source coupled to a first outer side of the conductive structure and a second outer side of the conductive structure to supply AC current horizontally through the conductive structure along a cross-track direction. The second outer side opposes the first outer side along the cross-track direction. The magnetic recording head also includes a trailing insulation layer disposed between the conductive structure and the trailing shield. The trailing insulation layer is of a width along a cross-track direction that is less than a width of the conductive structure along the cross track direction. The conductive structure includes a first side shield and a second side shield. Each of the first side shield and the second side shield is formed of a conductive material. The magnetic recording head assembly includes a leading side gap disposed on a leading side of the conductive structure and between a leading portion of the first side shield and a leading portion of the second side shield. A magnetic recording device including the magnetic recording head assembly is also disclosed.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head assembly, comprising:
a magnetic recording head, the magnetic recording head comprising:
an upper pole disposed at a media facing surface (MFS);
a lower pole disposed at the MFS;
a main pole;
a trailing shield disposed between the upper pole and the main pole at the MFS;
a leading shield disposed between the lower pole and the main pole at the MFS; and
a non-magnetic conductive structure disposed between the main pole and the trailing shield, or between the main pole and the leading shield; and
an alternating current (AC) source coupled to the main pole and the upper pole or the lower pole, wherein the AC source is recessed from the MFS.

2. The magnetic recording head assembly of claim 1, wherein the upper pole comprises a ledge, the ledge being recessed from the MFS.

3. The magnetic recording head assembly of claim 1, wherein the non-magnetic conductive structure comprises a plurality of conductive layers.

4. The magnetic recording head assembly of claim 3, wherein the plurality of conductive layers each has a different resistivity value.

5. The magnetic recording head assembly of claim 1, wherein the non-magnetic conductive structure has a width greater than or equal to a trailing width of the main pole.

6. The magnetic recording head assembly of claim 1, wherein the magnetic recording head further comprises side gap layers surrounding at least two surfaces of the main pole at the MFS, the side gap layers comprising a heat sink material.

7. The magnetic recording head assembly of claim 1, wherein the non-magnetic conductive structure is disposed in contact with the main pole and the trailing shield at the MFS, or is disposed in contact with the main pole and the leading shield at the MFS.

8. The magnetic recording head assembly of claim 1, wherein the AC source supplies AC current to the main pole and receives AC current returned from the upper pole.

9. A magnetic recording device comprising the magnetic recording head assembly of claim 1.

10. A magnetic recording head assembly, comprising:
a magnetic recording head, the magnetic recording head comprising:
an upper pole;
a lower pole disposed;
a main pole disposed between the upper pole and the lower pole;
a first conductive structure disposed between the main pole and the upper pole;
a second conductive structure disposed between the main pole and the lower; and
an alternating current (AC) source coupled to the lower pole and the upper pole of the magnetic recording head recessed from a media facing surface (MFS).

11. The magnetic recording head assembly of claim 10, wherein each of the first conductive structure and the second conductive structure comprises one or more non-magnetic conductive layers.

12. The magnetic recording head assembly of claim 10, wherein the AC source supplies AC current to the lower pole and receives AC current returned from the upper pole.

13. The magnetic recording head assembly of claim 10, further comprising a direct current (DC) source coupled to the main pole and the upper pole of the magnetic recording head.

14. The magnetic recording head assembly of claim 10, wherein the magnetic recording head further comprises:
a trailing shield disposed in contact with the upper pole and the first conductive structure at the MFS; and
a leading shield disposed in contact with the lower pole and the second conductive structure at the MFS.

15. The magnetic recording head assembly of claim 10, wherein the main pole is disposed in contact with the first conductive structure and the second conductive structure.

16. A magnetic recording device comprising the magnetic recording head assembly of claim 10.

17. A magnetic recording head assembly, comprising:
a magnetic recording head, the magnetic recording head comprising:
an upper pole disposed at a media facing surface (MFS);
a main pole disposed adjacent to the upper pole at the MFS;
a trailing shield disposed between the upper pole and the main pole at the MFS; and
a first non-magnetic conductive structure disposed in contact with the main pole and the trailing shield at the MFS; and
means for suppling an alternating current (AC) current to the main pole and receiving AC current returned from the upper pole.

18. The magnetic recording head assembly of claim 17, further comprising:
a leading shield disposed adjacent to the main pole;
a second non-magnetic conductive structure disposed in contact with the main pole and the leading shield; and
means for suppling a direct current (DC), the means for supplying the DC being coupled to the main pole and the upper pole of the magnetic recording head.

19. The magnetic recording head assembly of claim 18, wherein the second non-magnetic conductive structure has a greater cross-track width than the main pole.

20. The magnetic recording head assembly of claim 17, wherein the first non-magnetic conductive structure comprises one or more materials selected from the group consisting of: ruthenium (Ru), chromium (Cr), tantalum (Ta), gold (Au), copper (Cu), nickel-chrome (NiCr), nickel-aluminum (NiAl), nickel-tantalum (NiTa), and nickel-iron-tantalum (NiFeTa).

21. The magnetic recording head assembly of claim 17, wherein the upper pole comprises a ledge, the ledge being recessed from the MFS.

22. A magnetic recording device comprising the magnetic recording head assembly of claim 17.

* * * * *